United States Patent
Österback

(10) Patent No.: US 6,206,401 B1
(45) Date of Patent: Mar. 27, 2001

(54) TRAILER SUPPORT ARRANGEMENT

(76) Inventor: Anders Österback, Stafettgstan 12, 665 32, Kil (SE)

( * ) Notice: Subject to any disclaimer, the term of this patent is extended or adjusted under 35 U.S.C. 154(b) by 0 days.

(21) Appl. No.: 09/356,385

(22) Filed: Jul. 16, 1999

(51) Int. Cl.$^7$ ........................................................ B60D 1/66
(52) U.S. Cl. ........................ 280/475; 280/763.1; 280/432
(58) Field of Search ................................... 280/427, 475, 280/763.1, 764.1, 765.1, 767, 432

(56) References Cited

U.S. PATENT DOCUMENTS

| | | | |
|---|---|---|---|
| 3,181,891 | * | 5/1965 | Moats . |
| 3,783,960 | * | 1/1974 | Feliz ..................................... 180/14.2 |
| 4,113,274 | * | 9/1978 | Vahrenkamp ........................ 280/475 |
| 4,136,891 | * | 1/1979 | Menzel ................................. 280/475 |
| 4,368,899 | * | 1/1983 | Smalley et al. ...................... 280/477 |
| 5,497,969 | * | 3/1996 | Broughton ........................... 248/352 |

\* cited by examiner

Primary Examiner—Kevin Hurley
(74) Attorney, Agent, or Firm—Jeffrey Slusher

(57) ABSTRACT

The invention provides a supporting arrangement for a trailer that is towable by a vehicle, in which the trailer includes a tongue for connecting the trailer to the vehicle. The supporting arrangement includes a tongue jack mounted on the tongue. In a deployed position, the tongue jack vertically supports the tongue and thereby prevents contact between the tongue and the ground. In a retracted position, the supporting arrangement holds the tongue jack clear of the ground. A motion detection arrangement senses a dangerous trailer configuration, in which the tongue jack is in the deployed position and actual or potential motion of the trailer above a safe speed is present, and then activates a retraction assembly that automatically moves the tongue jack from the deployed to the retracted position upon activation of the release mechanism. A manual activation arrangement is preferably also included for allowing activation of the release mechanism by a user. In the preferred embodiment of the invention, the retraction assembly includes a solenoid that is able to release a pressurized gas cylinder that, upon extension, urges the tongue jack into the retracted position and that is re-pressurized by manual movement of the tongue jack into the deployed position.

9 Claims, 1 Drawing Sheet

TRAILER SUPPORT ARRANGEMENT

FIELD OF THE INVENTION

This invention relates to an arrangement for use with various types of trailers that have a tongue by which a vehicle can tow the trailer, and a tongue jack arrangement that supports the trailer when it is disconnected from the towing vehicle.

BACKGROUND ART

Trailers such as cargo trailers, camping trailers, boat trailers and the like that are used with automobiles and small trucks are often single-axle or bogie trailers that are towed via a tongue (also known as a "drawbar") that is connected to or integral with the chassis of the trailer. The tongue typically has a single-beam or wishbone structure, depending on the load the trailer is to carry. When the trailers are disconnected from the vehicle, a tongue jack is arranged mainly near the front part of the tongue to support the tongue so that it will not rest with its hitch on the ground, and also so that the trailer will stand mainly parallel to the ground to make for easier loading and unloading.

The tongue jack is commonly designed as a threaded rod within a tube so that a supporting wheel or plate can be cranked down to the ground when the trailer is unhitched, or up when it is hitched and ready to be towed. For some trailers, the tongue jack is often removably or pivotably mounted on the tongue by means of a bracket. When the bracket is removed or the jack pivoted up, the jack can be locked clear of the ground and the trailer can be safely towed.

A common problem is that many people forget to retract and lock the tongue jack when the trailer has been hitched to a towing vehicle. When the vehicle then drives away, the tongue jack will sooner or later catch on the ground or road with the result that the entire tongue jack arrangement is deformed or, in the worst case, torn off.

What is needed is an arrangement for tongue jacks that eliminates this risk.

SUMMARY OF THE INVENTION

The invention provides a supporting arrangement for a trailer that is towable by a vehicle, in which the trailer includes a tongue for connecting the trailer to the vehicle. The supporting arrangement includes a tongue jack mounted on the tongue. In a deployed position, the tongue jack vertically supports the tongue and thereby prevents contact between the tongue and the ground. In a retracted position, the supporting arrangement holds the tongue jack clear of the ground.

A retraction assembly is provided, which includes a release mechanism, and which moves the tongue jack from the deployed to the retracted position upon activation of the release mechanism. A motion detection arrangement is also provided for sensing a dangerous trailer configuration, in which the tongue jack is in the deployed position and actual or potential motion of the trailer above a safe speed is present, and for activating the retraction means and thereby the release mechanism upon sensing the actual or potential motion. A manual activation arrangement is preferably also included for allowing activation of the release mechanism by a user.

In the preferred embodiment of the invention, the retraction assembly includes an electrically activated, movable member (such as the core of a solenoid) that activates the release mechanism when the dangerous trailer configuration is sensed. A control rod is preferably included for transmitting motion of the movable member to the release mechanism. Furthermore, in the preferred embodiment, the retraction assembly includes a pressurized gas cylinder that is connected to the tongue jack and that, upon extension, urges the tongue jack into the retracted position and that is re-pressurized by manual movement of the tongue jack into the deployed position.

The motion detection arrangement preferably includes a switch, located in the vehicle, that connects the retraction means with a voltage source in the vehicle and thereby activates the retraction means when the vehicle generates an electrical signal associated with impending or actual motion of the vehicle.

BRIEF DESCRIPTION OF THE DRAWING

In FIG. 1, the tongue of the trailer is partially cut away so that the features of the tongue jack arrangement are more easily visible.

DETAILED DESCRIPTION

Figure 1:
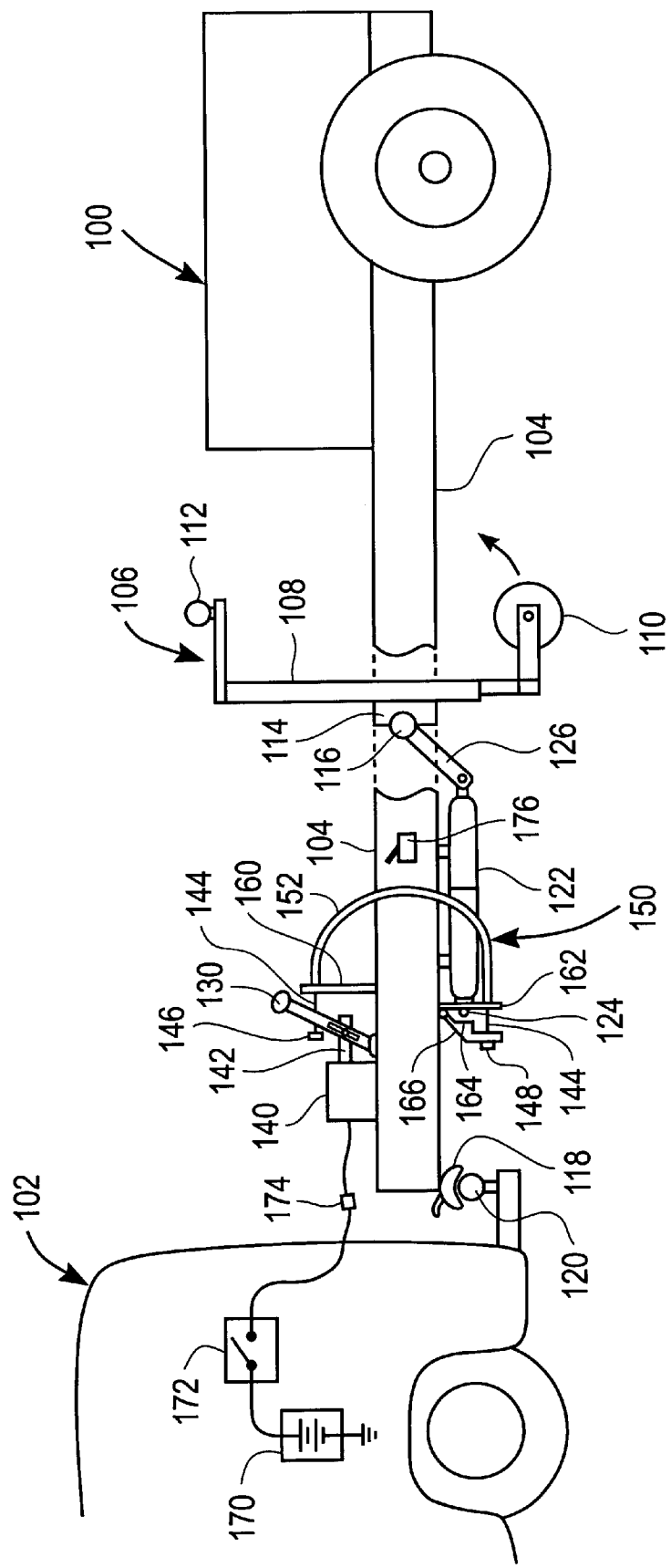
FIG. 1 illustrates a trailer that is connected to a towing vehicle and that is provided with the tongue jack retraction arrangement according to a preferably embodiment of the invention.

In FIG. 1, a trailer and a towing vehicle are indicated generally by references numerals 100 and 102, respectively. The tongue of the trailer is indicated by reference numeral 104, and extends in a longitudinal direction, that is, the direction on which the trailer will move when towed. FIG. 1 is not drawn to scale solely in order to make it easier to see the various features of the invention, and how they work. In the description of the invention below, the terms "left," "right," "clockwise," and "counter-clockwise" indicate directions and movements as viewed in FIG. 1.

A tongue jack, indicated generally by reference numeral 106, includes a main vertical tube, shaft or support—a down tube 108—and a supporting wheel (often, a caster wheel) or plate arrangement 110 that can be cranked or pivoted down via the down tube 108 using a crank or handle 112. According to the invention, the tongue jack 106 is rigidly connected (for example, by welding), preferably via a reinforcing bracket or plate 114 to an axle 116, which extends transversely to the tongue 104 (perpendicular to the plane of FIG. 1). The axle 116 (which may already be included on the trailer to retract and deploy an existing tongue jack), is mounted in any conventional way on the tongue so that the jack can pivot clockwise and counter-clockwise. For single-beam tongues, the jack arrangement may be mounted to either side of the beam, or in a cut-out portion; for wishbone-shaped tongues, the jack arrangement is preferably mounted between the two arms.

The trailer 100 is hitched to the vehicle 102 using any conventional arrangement. In FIG. 1, a common hitching ball arrangement is illustrated, in which a bracket 118 is placed onto and locked into place on a hitching ball 120.

According to the invention, an energy-storing device is mounted on the trailer, near the jack arrangement 106 on the tongue 104. In the preferred embodiment, the energy-storing device is a gas cylinder or gas damper 122 (or a combination of more than one such device, in order to increase the total extension power). The structure of such a gas cylinder is well known, for example, as a locking damper built into the pedestal of many modern office chairs. Gas cylinders such as the one preferably used in this invention typically either have a housing that "telescopes," that is, with at least one tube within another, or with a shaft that extends out from and retracts into the cylinder housing. This allows the cylinder as a whole to be lengthened and shortened, that is, to be extended and compressed. A locking or releasing mechanism such as a pin 124 is included in (typically, in the end of) the cylinder. When the pin (or other mechanism) depressed (or otherwise activated), then a piston or (other valve arrangement) within the cylinder housing is free to move and the cylinder can be extended or compressed. When the pin 124 is released, then the piston is prevented from moving and the cylinder "locks," that is, it strongly resists compression or extension. (In the invention, the cylinder preferably locks to become essentially rigid, unlike the cylinders used in chairs, which often become "springy." Cylinders of the rigidly locking type are commercially available.) In one working prototype of the invention, the gas pressure within the cylinder generated a compression force within the cylinder 122 of approximately 200 Newtons; when in the locked position (compressed, with no mechanical activation of the locking pin 124), the cylinder was able to hold roughly 1200 kg without extending.

In the invention, the end of the gas cylinder 122 opposite the locking pin 124 is pivotably connected to a lever arm 126, which is rigidly connected (for example, by welding) to the axle 116. Note that, if the downtube 108 is already pivotable about an existing axle, then it would also be possible to attach the cylinder directly to the downtube. The connection between the end of the cylinder and the arm 126 (or downtube 108) is arranged in any conventional manner (for example, with a pin that can slide in a cut-out aligned in the arm and aligned with the arm, or by allowing the cylinder itself to pivot, or via some other pivoting bracket) to allow the arm 126 to rotate as the cylinder is extended and compressed in its mounted position.

When the tongue jack arrangement 106 is deployed, that is, in its mainly vertical, deployed position (shown in FIG. 1), in which the wheel 110 contacts the ground and the tongue jack supports the tongue of the trailer, the cylinder 122 is substantially fully compressed. When the locking pin 124 is depressed, the gas cylinder is freed to expand, which pushes the arm 126 to cause it, and thus the whole jack arrangement, to rotate counter-clockwise (as indicated by the arrow next to the wheel 110) until the jack arrangement reaches a mainly horizontal, retracted position in which it is completely clear of the ground. The length of the arm 126 and the range of expansion of the cylinder are chosen using known design methods so that the jack arrangement is fully retracted when the cylinder is substantially fully extended.

To deploy the jack arrangement 106, the user rotates it clockwise, thereby compressing the cylinder. Note that the moment arm provided by the downtube 108 will be much larger than that between the cylinder 122 and the axle 116, so that the user will be able to compress the cylinder with relative ease.

The invention preferably provides for two separate ways—one manual and one automatic—to activate (cause to expand) the gas cylinder 122 by pressing the pin 124 (activating the release mechanism). A lever or handle 130 that is pivotably mounted on the tongue 104 (or at some other convenient position on the trailer) is used for manual retraction of the jack arrangement and an electromagnet—preferably a solenoid 140—is included to provide automatic retraction.

One way to provide manual retraction is to mount the pivoted handle 130 in such a way that it, or some member attached to it, depresses the pin 124 when the user moves the handle towards the pin. Similarly, automatic retraction can be provided by mounting the solenoid 140 so that its core shaft (or an extension mounted on the core shaft) pushes the pin when the core shaft is extended. In the preferred, illustrated embodiment of the invention, however, the handle 130 and solenoid 140 cooperate to activate the pin 124 via a cable 150.

The cable 150 is preferably a sheathed, flexible control rod of a structure similar to control rods used to remotely activate camera shutter releases, or as brake cables on most bicycles. As is well known, such flexible control rods have a central, flexible rod 144, usually with a stopper tip 146, 148 at either end. The central rod can slide freely within the outer sheath 152. In the preferred embodiment of the invention, the ends of the sheath 152 are secured in mainly vertical brackets or other supporting members 160, 162, through both of which the central rod 144 extends.

One end of the central control rod 144 is preferably attached to the handle 130, either rigidly or simply so that the central rod extends through the handle and is stopped by the stopper tip 146. The other end of the central control rod is preferably similarly attached to a pivoting arm 164, on which is a portion or protruding contacting member 166 (such as, for example, a bolt head, a small angle iron, a fold of metal stripping or simply a portion of the surface of the arm 164) that contacts the release pin 124 when then arm 164 pivots counter-clockwise. The core shaft 142 of the solenoid 140 is attached to the handle 130 (for example, via a slide or a pin in a lengthwise-extending cut-out portion of the handle) so that when the solenoid coil is energized (in the illustrated embodiment, the core is then pulled inward, to the left), the handle is forced to pivot counter-clockwise.

In embodiments of the invention in which the handle 130 and solenoid core 142 are connected, as in FIG. 1, the solenoid 140 is preferably chosen such that the core is able to move freely in and out when the solenoid is not energized. This allows for both automatic and manual retraction of the tongue jack arrangement using only the single, shared flexible control rod 150, with no need for any special mechanism for switching from the one retraction mode to the other. It is also possible to include two separate flexible control rods—one for the handle and one for the solenoid.

Whenever the handle 130 is moved to the left (that is, is pivoted counter-clockwise), either by the user or by retraction of the solenoid core shaft, the one end (at the handle 130) of the central control rod 144 will be pulled so that the pivoting arm 164 is pulled by the other end of the rod 144 towards the release pin 124. When the release pin is contacted, the gas cylinder 122 expands, which causes the arm 126 (and thus the jack arrangement 106) to pivot counter-clockwise into the retracted position.

When the handle pivots back clockwise (to the position illustrated in FIG. 1), the arm 164 will pivot away from the release pin 124 under the outward force of the pin. If the ends of the control rod 144 are rigidly attached to the handle 130 and arm 164, then the motion of the rod 144 itself will cause the arm 164 to pivot away.

In order to provide for automatic retraction of the tongue jack arrangement 106, it is necessary to be able to activate the solenoid 140 even when the user forgets to do so manually using the handle 130. Accordingly, the solenoid 140 is preferably connected to the vehicle's 102 battery 170 (or to some other voltage-supplied part of the vehicle's electrical system) via at least one switch 172, and a contact 174 that allows the trailer to be electrically connected to the vehicle. (Such contacts are well known and are used, for example, to connect the trailer's tail lights to the vehicle's electrical system.)

The switch 172 should preferably be connected (preferably in parallel) to or be part of the electrical system of the vehicle that is activated only when the vehicle is moving, is about to move, or is preparing to move, that is, whenever the trailer is in a potentially dangerous configuration with the tongue jack arrangement 106 deployed and the vehicle ready to tow the trailer too fast. There are many such possible connections; the preferred connection will in general depend on the vehicle and may be chosen using normal design considerations. In some countries such as Sweden, most vehicles' head and tail lights are automatically turned on whenever the vehicle's engine is running. The switch 172 could, in such case, be connected to the headlight supply circuit such that the switch 172 closes when current is supplied to the headlights. Another alternative would be to connect the switch 172 to close along with the vehicle's ignition switch. Yet another possibility is to connect the switch in parallel to the rear brake lights—even in vehicles with automatic transmissions, the brake lights are often activated briefly when the shift lever is moved out of the "PARK" position; in most others, it is necessary to depress the brake pedal even to move the shift lever out of "PARK." Still another activating circuit for the switch 172 could be the switch that senses that the parking brake has been released.

When the trailer 100 (that is, the solenoid 140) is connected electrically to the vehicle via the contact 174, and the switch 172 is closed along with whichever activating circuit is used, then the solenoid 140 will be energized, the core 142 will be pulled in, the handle 130 will be pivoted counter-clockwise, the arm 164 will be pivoted towards the release pin 124 by the flexible control rod 144, the gas cylinder 122 will be free to expand, which will cause the arm 126 to pivot and the tongue jack arrangement 106 will rotate counter-clockwise into the retracted position. The invention thus provides that whenever the vehicle is moving, is about to move, or is preparing to move, the solenoid 140 will be energized and the energy stored in the device 122 (such as the cylinder) is released and used to retract the tongue jack arrangement 106.

A switch 176, such as a standard microswitch, is preferably provided, for example, in series between the contact 174 and the solenoid 140. The switch 176 is mounted on the tongue or at some other convenient position so that, when the tongue jack arrangement 106 is in the mainly horizontal, fully retracted position, it physically contacts and opens the switch 176, thus de-energizing the solenoid 140. This will then free the arm 164 to pivot away from the release pin 124 and "lock" the gas cylinder 122, and thus the tongue jack arrangement 106 itself. The tongue jack arrangement 106 thus is held securely in the retracted position until the user manually frees the cylinder 122 (via the handle 130) and moves the tongue jack arrangement back into the vertical, deployed position, which then re-pressurizes (compresses) the cylinder 122 for its next use.

A gas cylinder 122 is preferred as the energy-storing device, because it is easy to operate, is reliable, is commercially available, and locks securely whenever the release pin 124 is not depressed (or pulled out, depending on the chosen cylinder, in which case the arm 164 must be remounted to pull out rather than push in the pin 124). It would also be possible, however, to use a spring, as long as it can develop sufficient force to retract the tongue jack arrangement 106 while still being easy enough for users to recompress, and provided that some locking mechanism is included to prevent accidental deployment of the tongue jack arrangement 106.

In FIG. 1, the gas cylinder 122 and arms 126, 164 are shown mounted below the tongue 104. This is not necessary. Rather, these members (and the related brackets, etc.) may be mounted above the tongue, or even on its side, as long as modifications are made to enable the cylinder 122 to cause the tongue jack arrangement 106 to retract. The needed modifications will be obvious to skilled mechanical designers. If the gas cylinder is properly aligned with the solenoid and/or handle, then one could replace the sheathed, flexible control rod with a rigid control rod or shaft.

It would also be possible to make the invention even more self-contained by including a dedicated voltage source that is independent of the vehicle's battery. Conventional mechanical actuators or electrical sensors could then be attached to the trailer or tongue to sense impending towing of the trailer based on trailer motion or position alone and to energize the solenoid or mechanically release the cylinder when sensing this. One could, for example, sense the speed of rotation of the trailer's wheel, or of the jack wheel 110, and activate the solenoid if this speed indicates movement faster than what a user could cause simply by pulling the trailer by hand. The disadvantages of such a solution, however, include the need for the independent battery (unless purely mechanical actuation is provided) and the need for additional sensors.

Recall that FIG. 1, in order to make the invention more clearly understandable, is not necessarily to scale; indeed, the entire arrangement according to the invention will in general be much smaller, relative to the vehicle and trailer, than appears in FIG. 1. It is therefore also possible to manufacture all or at least most of the various components of the invention as a unit that can be quickly and conveniently mounted on or retrofitted onto existing tongue jacks.

I claim:

1. A supporting arrangement for a trailer that is towable by a vehicle, in which the trailer includes a tongue for connecting the trailer to the vehicle, the supporting arrangement comprising:

a tongue jack mounted on the tongue,
the tongue jack, in a deployed position, vertically supporting the tongue and thereby preventing contact between the tongue and an underlying surface over which the vehicle and trailer can move, and, in a retracted position, being clear of the underlying surface;

retraction means, which includes a release mechanism, for moving the tongue jack from the deployed to the retracted position upon activation of the release mechanism; and a switch connecting the retraction means to an electrical system of the vehicle and forming means for sensing a dangerous trailer configuration, in which the tongue jack is in the deployed position and actual or potential motion of the trailer above a safe speed is present, the switch arrangement being activated and thereby activating the release mechanism upon actual or potential motion of the vehicle.

2. An arrangement as in claim 1, in which the retraction means includes an electrically activated, movable member that activates the release mechanism when the dangerous trailer configuration is sensed.

3. An arrangement as in claim 2, in which the retraction means includes a solenoid, whereby the electrically activated, movable member is a core shaft of the solenoid.

4. An arrangement as in claim 2, further including a control rod for transmitting motion of the movable member to the release mechanism.

5. An arrangement as in claim 2, further including manual activation means for allowing activation of the release mechanism by a user.

6. An arrangement as in claim 4, further including manual activation means that is connected to the control rod for allowing activation of the release mechanism by a user, in which the movable member is connected to the manual activation means for activating the control rod by moving the manual activation means.

7. An arrangement as in claim 1, in which the retraction means includes a pressurized gas cylinder that is connected to the tongue jack and that, upon extension, urges the tongue jack into the retracted position and that is re-pressurized by manual movement of the tongue jack into the deployed position.

8. An arrangement as in claim 2, in which the switch is located in the vehicle and connects the retraction means with a voltage source in the vehicle and thereby activates the retraction means when the vehicle generates an electrical signal associated with impending or actual motion of the vehicle.

9. A supporting arrangement for a trailer that is towable by a vehicle, in which the trailer includes a tongue for connecting the trailer to the vehicle, the supporting arrangement comprising:

a tongue jack mounted on the tongue,
  the tongue jack, in a deployed position, vertically supporting the tongue and thereby preventing contact between the tongue and an underlying surface over which the vehicle and trailer can move, and, in a retracted position, being clear of the underlying surface;

retraction means, which includes a release mechanism, for moving the tongue jack from the deployed to the retracted position upon activation of the release mechanism;

a switch connecting the retraction means to an electrical system of the vehicle and forming means for sensing a dangerous trailer configuration, in which the tongue jack is in the deployed position and actual or potential motion of the trailer above a safe speed is present, the switch arrangement being activated and thereby activating the release mechanism upon actual or potential motion of the vehicle;

manual activation means for allowing activation of the release mechanism by a user;

in which:

the retraction means includes an electrically activated, movable member that activates the release mechanism when the dangerous trailer configuration is sensed;

a control rod is included for transmitting motion of the movable member to the release mechanism;

the retraction means includes a solenoid, whereby the electrically activated, movable member is a core shaft of the solenoid;

the retraction means includes a pressurized gas cylinder that is connected to the tongue jack and that, upon extension, urges the tongue jack into the retracted position and that is re-pressurized by manual movement of the tongue jack into the deployed position;

and the switch is located in the vehicle and connects the retraction means with a voltage source in the vehicle and thereby activates the retraction means when the vehicle generates an electrical signal associated with impending or actual motion of the vehicle.

* * * * *